(12) United States Patent
Ljung et al.

(10) Patent No.: US 9,781,571 B2
(45) Date of Patent: Oct. 3, 2017

(54) METHODS, SYSTEMS AND COMPUTER PROGRAM PRODUCTS FOR REGISTRATION OF AND ANONYMOUS COMMUNICATIONS RELATED TO TAGGED OBJECTS

(75) Inventors: Peter Ljung, Lund (SE); Johan Wadman, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 391 days.

(21) Appl. No.: 13/496,961

(22) PCT Filed: Apr. 20, 2011

(86) PCT No.: PCT/IB2011/000872
§ 371 (c)(1),
(2), (4) Date: Jul. 9, 2012

(87) PCT Pub. No.: WO2012/143744
PCT Pub. Date: Oct. 26, 2012

(65) Prior Publication Data
US 2012/0268239 A1    Oct. 25, 2012

(51) Int. Cl.
*G08C 17/02*   (2006.01)
*G06F 7/04*    (2006.01)
(Continued)

(52) U.S. Cl.
CPC ......... *H04W 4/028* (2013.01); *H04L 63/0407* (2013.01); *H04W 4/008* (2013.01); *H04W 12/02* (2013.01); *H04W 64/00* (2013.01)

(58) Field of Classification Search
None
See application file for complete search history.

(56) References Cited

U.S. PATENT DOCUMENTS 4,445,118 A    4/1984 Taylor et al.
5,418,538 A    5/1995 Lau
(Continued)

FOREIGN PATENT DOCUMENTS

CN    1384955 A    12/2002
CN   101593330 A   12/2009
(Continued)

OTHER PUBLICATIONS

Notification Concerning Transmittal of International Preliminary Report on Patentability in corresponding PCT Application No. PCT/IB2011/000872 mailed Oct. 31, 2013 (10 Pages).
(Continued)

*Primary Examiner* — Curtis King
*Assistant Examiner* — Chico A Foxx
(74) *Attorney, Agent, or Firm* — Myers Bigel, P.A.

(57) ABSTRACT

Systems and methods of registration of an anonymous tag having an owner with a location service include authenticating a tag sensor associated with the owner of the tag with the location service. The tag is placed within a defined transmission distance of the tag from the tag sensor associated with the owner. The tag is activated while it is within the defined distance from the tag sensor to initiate transmission of the self identification. The transmitted self identification is received at the tag sensor to detect the tag. It is determined that the detected tag is not yet registered with the location service and an identification of the tag and the owner is transmitted to the location service from the tag sensor to register the tag as belonging to the owner at the location service to limit registration of the tag at the location service.

15 Claims, 10 Drawing Sheets

(51) Int. Cl.
*H04W 4/02* (2009.01)
*H04L 29/06* (2006.01)
*H04W 4/00* (2009.01)
*H04W 12/02* (2009.01)
*H04W 64/00* (2009.01)

(56) References Cited

U.S. PATENT DOCUMENTS

| | | |
|---|---|---|
| 5,663,734 A | 9/1997 | Krasner |
| 5,663,735 A | 9/1997 | Eshenbach |
| 6,433,735 B1 | 8/2002 | Bloebaum et al. |
| 6,967,577 B2 * | 11/2005 | Taylor ................... G06K 7/0008 235/375 |
| 7,164,354 B1 * | 1/2007 | Panzer ................ G07C 9/00111 235/384 |
| 7,218,228 B2 * | 5/2007 | Sakamoto ............ G06K 7/0008 340/572.1 |
| 7,248,167 B2 | 7/2007 | Wassingbo |
| 7,420,465 B2 * | 9/2008 | Ritter ........................ 340/539.32 |
| 2002/0036569 A1 * | 3/2002 | Martin ........................ 340/573.1 |
| 2003/0011511 A1 | 1/2003 | King et al. |
| 2003/0095032 A1 | 5/2003 | Hoshino et al. |
| 2005/0035860 A1 | 2/2005 | Taylor et al. |
| 2005/0093698 A1 * | 5/2005 | Sakamoto ............ G06K 7/0008 340/572.1 |
| 2006/0044115 A1 | 3/2006 | Doi et al. |
| 2006/0055538 A1 | 3/2006 | Ritter |
| 2006/0106735 A1 * | 5/2006 | Bartz ...................... G06Q 20/20 705/75 |
| 2006/0148443 A1 * | 7/2006 | Burg ....................... G06K 17/00 455/403 |
| 2008/0079581 A1 * | 4/2008 | Price ...................... G06Q 10/08 340/572.1 |
| 2008/0122584 A1 | 5/2008 | Itasaki et al. |
| 2008/0220720 A1 * | 9/2008 | Ashley et al. ............... 455/41.2 |
| 2009/0036104 A1 * | 2/2009 | Malik ................... G01S 13/878 455/414.1 |
| 2010/0082457 A1 | 4/2010 | Eisenberg et al. |
| 2010/0164742 A1 * | 7/2010 | Anderson ............. G01D 21/00 340/539.22 |
| 2011/0234399 A1 * | 9/2011 | Yan ........................ G08B 21/24 340/539.32 |
| 2015/0084745 A1 * | 3/2015 | Hertz ...................... H04W 4/02 340/10.3 |

FOREIGN PATENT DOCUMENTS

| | | |
|---|---|---|
| EP | 1 589 471 A2 | 10/2005 |
| KR | 2010 0070948 A | 6/2010 |
| WO | WO 00/37958 A2 | 6/2000 |
| WO | WO 01/31600 A1 | 5/2001 |
| WO | WO 2006/092220 A2 | 9/2006 |
| WO | WO 2007/125319 A1 | 11/2007 |

OTHER PUBLICATIONS

International Search Report Corresponding to International Application No. PCT/162011/000872; Date of Mailing: Feb. 16, 2012; 16 Pages.
International Search Report Corresponding to International Application No. PCT/IB2011/000867; Date of Mailing: Feb. 16, 2012; 6 Pages.
Chinese Office Action corresponding to Chinese Application No. 201180069432.2, Date Mailed: Aug. 6, 2015, Foreign Text: 9 pages, English Translation Thereof: 10 pages.

* cited by examiner

METHODS, SYSTEMS AND COMPUTER PROGRAM PRODUCTS FOR REGISTRATION OF AND ANONYMOUS COMMUNICATIONS RELATED TO TAGGED OBJECTS

RELATED APPLICATION

The present application is a 35 U.S.C. §371 national stage application of PCT International Application No. PCT/IB2011/000872, having an international filing date of Apr. 20, 2011, the disclosure of which is incorporated by reference herein in its entirety.

FIELD OF THE INVENTION

This invention relates to locating services and anonymous tags, and more particularly to locating services for objects that may be movable.

BACKGROUND OF THE INVENTION

It has been proposed in U.S. Pat. No. 7,248,167 ("the '167 patent") to use Radio Frequency Identification (RFID) signals to provide updated location information about movable objects owned by the owner. However, the methods in the '167 describe approaches where the owner or those authorized by the owner are used as RFID in locating the objects.

SUMMARY OF INVENTION

In some embodiments of the present invention, computer-implemented methods of registration of an anonymous tag having an owner with a location service are provided. The tag is configured to transmit a self identification over a defined distance using a short range wireless protocol. A tag sensor associated with the owner of the tag is authenticated with the location service. The tag is placed within the defined distance from the tag sensor associated with the owner. The tag is activated while it is within the defined distance from the tag sensor to initiate transmission of the self identification. The transmitted self identification is received at the tag sensor to detect the tag. It is determined that the detected tag is not yet registered with the location service and an identification of the tag and the owner is transmitted to the location service from the tag sensor to register the tag as belonging to the owner at the location service to limit registration of the tag at the location service.

In other embodiments, the tag sensor is a mobile terminal. The mobile terminal may have an identification that is known to the location service and associated with the owner. Authenticating the tag sensor may include transmitting the identification of the mobile terminal to the location service from the tag sensor. Placing the tag within the defined distance may be preceded by obtaining a tag that has not been registered with the location service for use as the tag, wherein power to the tag is off when the tag is obtained. Activating the tag may include turning on the power to the tag within the defined distance from the tag sensor. Turning on the power to the tag may include turning on the power to the tag using an actuator that cannot be reset to turn the power to the tag off so that the tag will continue transmission of the self identification until a battery included in the tag is discharged.

In further embodiments, receiving the transmitted self identification includes receiving at least one additional identification from another tag. It is determined that the another tag is already registered with the location service. The another tag is not registered as belonging to the owner at the location service.

In other embodiments, at least one additional self identification is received from another tag and the method further includes determining that the another tag is not yet registered with the location service and comparing a signal strength of the received transmitted self identifications of the tag and the another tag. Transmitting an identification includes transmitting an identification of the tag to register the tag as belonging to the owner when the signal strength of the self identification of the tag is greater than the signal strength of the self identification of the another tag and transmitting an identification of the another tag to register the another tag as belonging to the owner when the signal strength of the self identification of the another tag is greater than the signal strength of the self identification of the tag.

In further embodiments, transmitting the identification is preceded by presenting the identification of the tag to a user on a display of the mobile terminal. A selection of the displayed identification as belonging to the owner is received from the user, and transmitting the identification is only carried out responsive to receiving the selection of the displayed identification.

In yet other embodiments, determining that the tag is not yet registered includes receiving a message at the tag sensor from the location service indicating that the tag is already registered to another owner. A confidential ownership code is then for the tag that is only provided to a lawful owner of the tag. The ownership code is transmitted to the location service to un-register the tag so that the tag is not associated with the another owner at the location service.

In other embodiments, transmitting the identification is followed by transmitting a request to un-register the tag to the location service from the tag sensor to allow the tag to be registered as belonging to another owner. Transmitting the identification may be followed by transmitting a permission from the tag sensor to another tag sensor that authorizes another owner associated with the another tag sensor to obtain information related to the tag from the location service.

In further embodiments, the tag comprises a plurality of tags, each including a visible public code associated therewith and each of which has a self identification. Transmitting the identification is followed by retrieving the visible public code for each tag from the location service for use in differentiation visually between the plurality of tags.

In yet other embodiments, computer-implemented methods of registration of an anonymous tag at a location service include registering a tag sensor associated with an owner with the location service. A request is received to register the tag from the tag sensor at the location service. The request to register includes the self identification of the tag and an identification of the tag sensor. It is determined, based on the self identification of the tag, if the tag is already registered. A notification is transmitted to the tag sensor that the tag is already registered when it is determined that the tag is already registered. The owner of the tag is determined based on the received identification of the tag sensor and the tag is registered as belonging to the owner at the location service when it is determined that the tag is not yet registered. The self identification of the tag and the identification of the tag sensor may be received from two different transmissions.

In further embodiments, mobile terminals for registering anonymous tags are provided. The mobile terminals are registered with a location service as being associated with an owner. The mobile terminals include a processor and a communication interface coupled to the processor that is configured to communicate over a wide area network with a remote location service and to receive transmissions from a tag in the vicinity of the mobile terminal using a short range wireless protocol. A detected tag registration module is configured to receive, using the communication interface, a transmitted self identification to detect one of the anonymous tags as a detected tag when the detected tag is activated in the vicinity of the mobile terminal. The registrations module is also configured to determine that the detected tag is not yet registered with the location service and to transmit, using the communication interface, an identification of the tag and the owner to the location service to register the tag as belonging to the owner at the location service to limit registration of the tag at the location service.

In other embodiments, a location server for providing information associated with anonymous tags includes a processor and a memory coupled to the processor that includes a registered tag database that includes, for each of a plurality of registered ones of the anonymous tags, a self identification and an owner associated with each of the registered ones of the anonymous tags, and an owner database that includes, for each of a plurality of registered owners, a tag sensor associated with each of the registered owners. A communication interface coupled to the processor is configured to receive a registration request, that includes identification of one of the anonymous tags, from one of the tag sensors of one of the registered owners. A registration module executing on the processor is configured to determine if the one of the anonymous tags identified in a received registration request is already registered using the registered tag database. The registration module is also configured to update the registered tag database to include an entry for the one of the anonymous tags identified in the received registration request to register the one of the anonymous tags identified in the received registration request as associated with the registered owner associated the one of the tag sensors that the request was received from using the owner database.

In yet other embodiments, computer-implemented methods of providing communications related to detection of an anonymous tag include receiving a tag identification (ID) information report from a tag sensor, which may be a mobile terminal. An object associated with the ID information report received from the tag sensor is identified. An owner associated with the identified object is determined. A communication is routed between a user associated with the tag sensor and the owner responsive to the received tag identification without identifying the user to the owner or the owner to the user. The user may also be an owner of objects having associated tags. The tag sensor may be an actuator coupled to a physical display that is configured to transmit the ID information report responsive to activation of the actuator by a user and the identified object is the physical display.

In further embodiments, routing a communication includes receiving a reporting message associated with the ID information report from the mobile terminal and then transmitting the received reporting message to the owner. The mobile terminal may be a first mobile terminal and transmitting the received reporting message may include determining a mobile terminal associated with the owner and then transmitting the received reporting message to the mobile terminal associated with the owner. Transmitting the received reporting message may include transmitting an identification of a source of the reporting message and only transmitting the reporting message responsive to a received acceptance from the mobile terminal associated with the owner.

In further embodiments, an authorization to identify the owner to the first mobile terminal is received from the owner. The mobile terminal associated with the owner is identified to the first mobile terminal to enable direct communications between the mobile terminal associated with the owner and the first mobile terminal. An authorization to identify the first mobile terminal to the owner may be received from the first mobile terminal. The first mobile terminal may be identified to the mobile terminal associated with the owner to enable direct communications between the mobile terminal associated with the owner and the first mobile terminal.

In other embodiments, routing the communication is preceded by receiving a response message associated with the identified movable object from the owner and saving the received response message and a relationship of the message to the identified object. Routing the communication includes retrieving the response message associated with the identified object and transmitting the response message to the mobile terminal without identifying the owner and transmitting a notification of transmission of the response message to the owner without identifying the mobile terminal. Transmitting the response message may be followed by exchanging further messages between the owner and the mobile terminal without identifying the owner to the mobile terminal or the mobile terminal to the owner. The object may be a movable object and the received ID information may include a location of the mobile terminal. The notification of the transmission may include the location of the mobile terminal to provide the owner updated location information for the movable object.

In yet other embodiments, routing the communication includes transmitting a notification of location information for the movable object to the owner that includes the location of the mobile terminal to provide the owner updated location information for the movable object, responsive to receiving the ID information report, without identifying the mobile terminal to the owner. A response message is received from the owner responsive to the transmitted notification of location information and then the received response message is transmitted to the mobile terminal without identifying the owner to the mobile terminal. Transmitting the received reporting message may include posting the reporting message on an electronic bulletin board along with an identification of the object associated with the reporting message without identifying the owner or the mobile terminal, wherein the electronic bulletin board is accessible to a plurality of owners.

In further embodiments, an anonymous communication server for providing communications related to detection of anonymous tags includes a processor and a memory coupled to the processor. The memory includes a registered tag database that includes, for each of a plurality of registered ones of the anonymous tags, a self identification and an owner associated with each of the registered ones of the anonymous tags. The memory also includes an owner database that includes, for each of a plurality of registered owners, a mobile terminal associated with each of the registered owners. A communication interface coupled to the processor is configured to receive a tag identification (ID) information report from a mobile terminal and to route a communication between mobile terminals. A routing module is configured to identifying an object associated with the ID information report received from the mobile terminal, to determine an owner associated with the identified object using the registered tag database and to route a communication, using the communication interface, between the mobile terminal and the mobile terminal associated with the owner using the owner database responsive to the received tag identification without identifying the mobile terminal to the owner or the owner to the mobile terminal.

In further embodiments, the service includes an electronic bulletin board and the routing module is configured to route the communication using a posting on the electronic bulletin board. The object may be a movable object and the received ID information may include a location of the mobile terminal. The routing module may be further configured to transmit a notification of location information for the movable object to the owner that includes the location of the mobile terminal to provide the owner updated location information for the movable object, responsive to receiving the ID information report, without identifying the mobile terminal to the owner. The routing module may be configured to receive a response message from the owner responsive to the transmitted notification of location information and transmit the received response message to the mobile terminal without identifying the owner to the mobile terminal.

Computer program products and computing devices including other aspects of the methods described above are also provided.

DETAILED DESCRIPTION OF PREFERRED EMBODIMENTS

Figure 1:
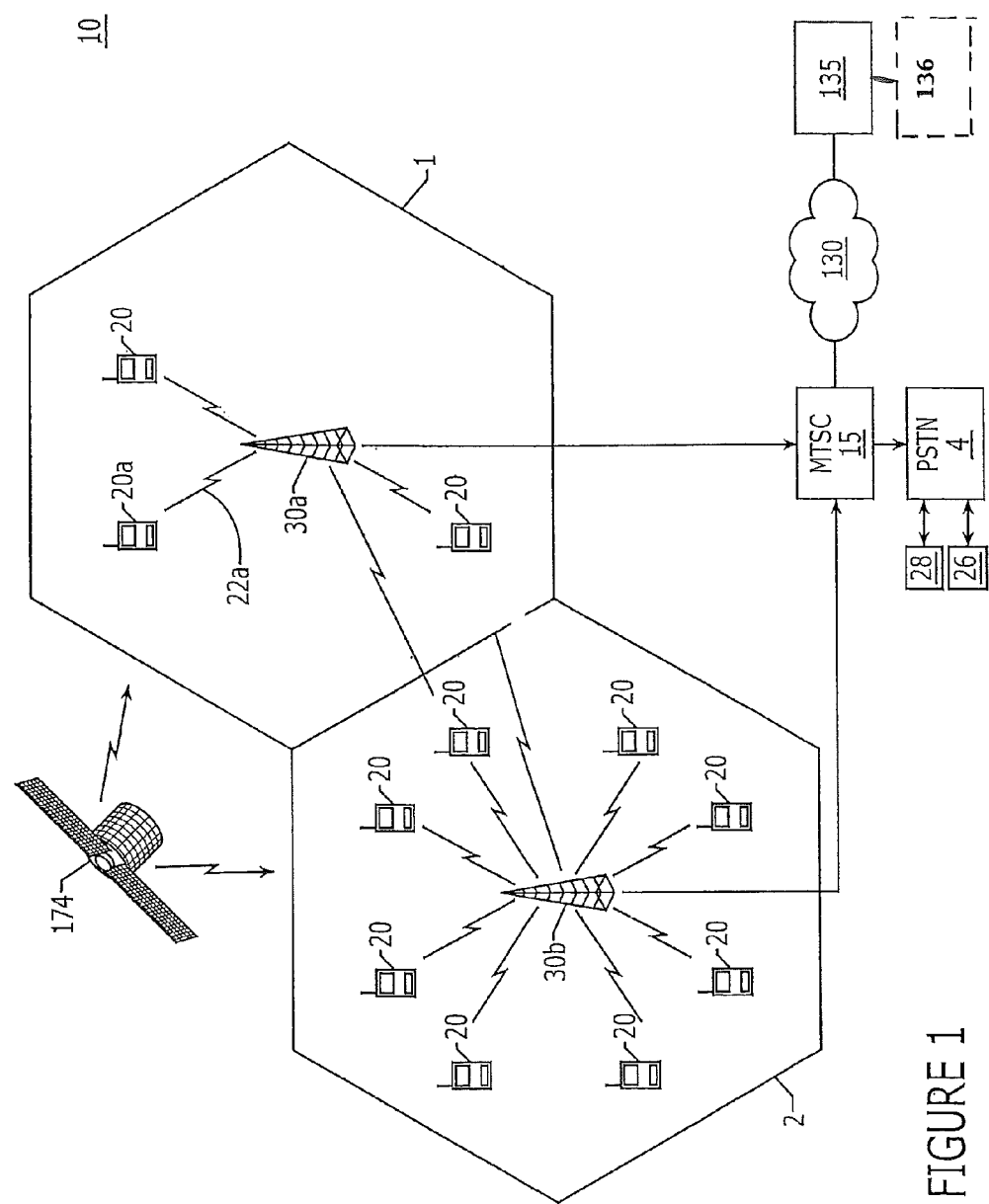
FIG. 1 is a schematic illustration of a wireless communications network that provides service to mobile terminals according to some embodiments of the invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

It will be understood that the invention may be practiced with any mobile terminal as a tag sensor or other devices as the tag sensor that are coupled to a communications network. A mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop receiver or other appliance all of which include a radiotelephone transceiver. While generally described herein with the tag sensors as mobile devices moving into proximity of a object being located, it will be understood that the tag sensors may also be non-mobile devices having short range wireless protocol receivers therein that detect the presence of an anonymous tag in their proximity (i.e., within range of a short range wireless protocol network supported by the tag sensor).

It will be understood mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

As described herein in greater detail, in some embodiments according to the invention, the mobile terminal (or other tag sensor) periodically receives unique Identification (ID) Information from tags coupled to moveable objects, such as a wallet, an automobile, a briefcase, a set of keys, etc. In addition to registration related operations or communications linked to objects, the mobile terminal in some embodiments can also determine location information (or have location information determined), using for example GPS, which may be provided to a location service/computer server (location server) where this location information may be associated with the ID Information for each moveable object. As the location information is periodically determined, it can be used to update the location information for the moveable objects. If a user suspects that a moveable object has been lost or misplaced, the user could then access the location information. The location information can also include a time at which the most recently known location information for the moveable object was established. The user may refer to the time to gain further insight into, where the moveable object may have been misplaced or dropped.

It will be understood that the tag registration and tag related anonymous communications embodiments described and claimed herein are not limited to location services that support tracking of geographic information. The location services may, instead provide registration of and/or anonymous communications related to objects for other purposes related to the objects that do not include geographic location information. In addition, while generally referred to herein with reference to movable objects, embodiments of the present invention are not limited to use with movable objects but may also be applied to objects that are not movable.

FIG. 1 is a diagram that illustrates a wireless communications network (network) 10 that supports communications in which mobile terminals 20 according to the invention can be used. Networks 10 are commonly employed to provide voice and data communications to subscribers using, for example, the standards discussed above. According to FIG. 1, the mobile terminals 20 can communicate with each other via a Mobile Telephone Switching Center (MTSC) 15. The mobile terminals 20 can also communicate with other terminals, such as terminals 26, 28, via a Public Service Telephone Network (PSTN) 4 that is coupled to the network 10. As also shown in FIG. 1, the MTSC 15 is coupled to a computer server 135 supporting a location service 136 (i.e., a location server) via a network 130, such as the Internet.

The network 10 is organized as cells 1-2 that collectively can provide service to a geographic region. In particular, each of the cells can provide service to associated sub-regions included in the geographic region covered by the network 10. More or fewer cells can be included in the network 10, and the coverage area for the cells may overlap. Each of the cells may include an associated base station 30a-b. The base stations 30a-b can provide wireless communications between each other and the mobile terminals 20 in the associated geographic region to allow for communications therebetween.

Each of the base stations 30a-b can transmit/receive data to/from the mobile terminals 20 over an associated control channel. For example, the base station 30a in cell 1 can communicate with the mobile terminal 20a over the control channel 22a. The control channel 22a can be used, for example, to page the mobile terminal 20a in response to calls directed thereto or to transmit traffic channel assignments to the mobile terminal 20a over which a call associated therewith is to be conducted.

The mobile terminals 20 may also be capable of receiving messages from the network 10 over the respective control channel 22. In some embodiments according to the invention, the mobile terminals receive Short Message Service (SMS) or Enhanced Message Service (EMS) formatted messages, Multimedia Message Service (MMS), and/or Smartmessaging™ formatted messages.

A Global Positioning System (GPS) 174 can provide GPS information to the geographic region including cells 1-2 so that the mobile terminals 20 may determine location information. The location information can be applied to identification information received by the mobile terminals from tags coupled to moveable objects. As described herein in greater detail, the network 10 may also provide network location information as the basis for the location information applied by the mobile terminals. In addition, the location information may be provided directly to the server 135 rather than to the mobile terminals 20, which then may provide the location information to the server 135.

Figure 2:
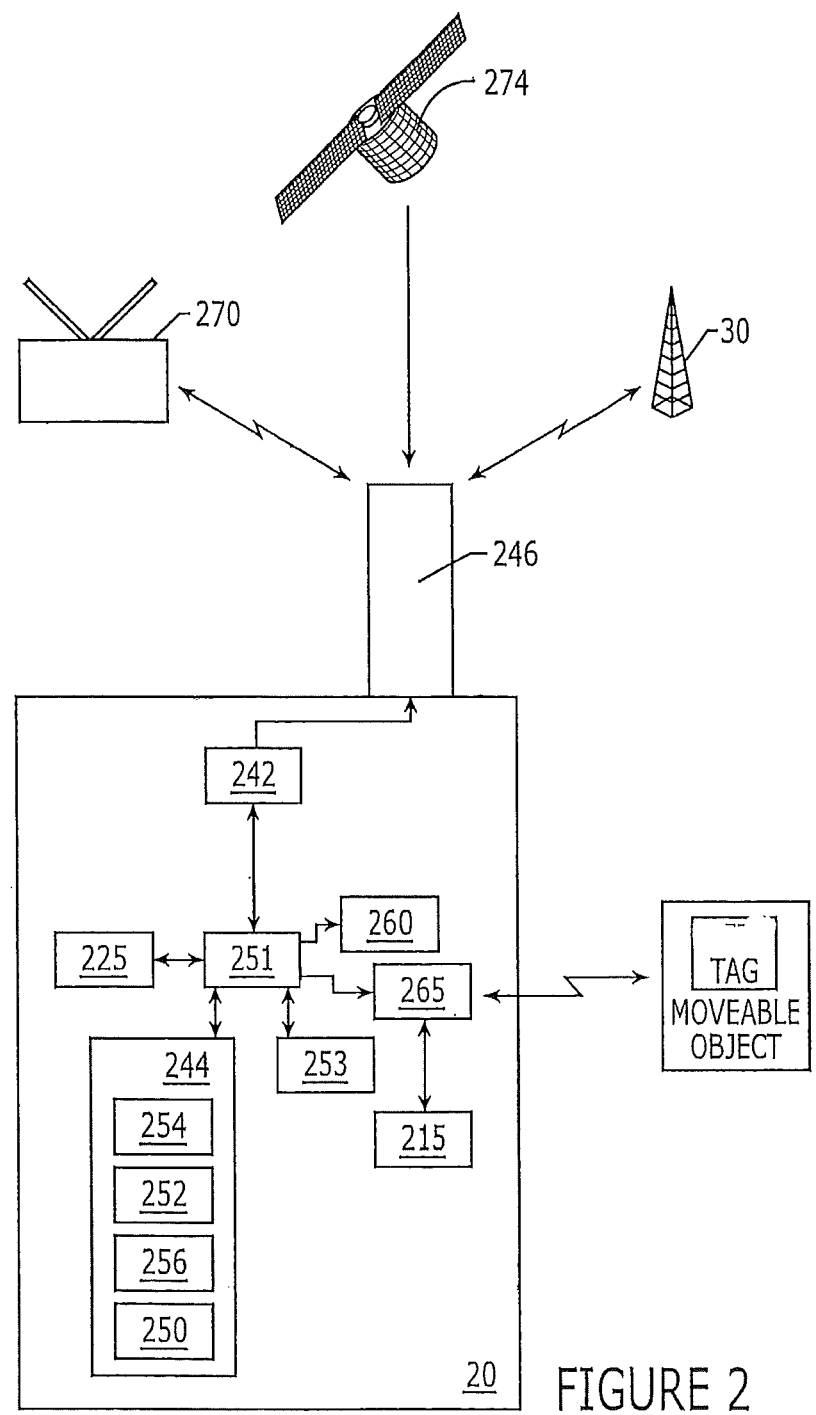
FIG. 2 is a schematic block diagram that illustrates mobile terminals as tag sensors according to some embodiments of the invention.

FIG. 2 is a block diagram that illustrates embodiments of mobile terminals 20 according to the invention. As illustrated in FIG. 2, the mobile terminal 20 includes a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts information, which is to be transmitted by the mobile terminal 20, into electromagnetic signals suitable for radio communications. A receiver portion of the transceiver 242 demodulates electromagnetic signals, which are received by the mobile terminal 20 from the network 10 to provide the information contained in the signals in a format understandable to the user.

A user interface 244 of the mobile terminal 20 may include a variety of components, such as a display 254, a keypad 252, a speaker 256, and a microphone 250, operations of which are known to those of skill in the art. It will be understood that the functions of the keypad 252 and the display 254 can be provided by a touch screen through which the user can view information, such as computer displayable documents, provide input thereto, and otherwise control the mobile terminal 20.

A processor circuit 251 provides for overall operation of the mobile terminal 20 including coordination of communications via the transceiver circuit 242, the user interface 244, and other components included in the mobile terminal 20. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

Processor circuit 251 may be configured to communicate data over the radio transceiver circuit 242 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, Bluetooth, RFID, and/or WLAN (e.g., 802.11a, 802.11b, 802.11e, 802.11g, and/or 802.11i).

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile terminal 20), Voice Activated Dialing (VAD) services, performing media operations and the like.

The mobile terminal 20 includes a tag reader circuit 265 that is configured to support receiving and formatting for transmission to, for example, a location service tag identifications received from transmitting tags in proximity to the mobile terminal 20. The tag reader circuit 265 is configured to receive tag identifications using a short range wireless transmission protocol even when the mobile terminal 20 does not have any knowledge of the source of the received tag identification. In some embodiments including geographic location services, the tag reader circuit is further configured to format the received tag identification as an ID information report and transmit the ID information report to a geographic location service over a wide area cellular network communicatively coupled to the mobile terminal 20, such as through the base station 30. As the mobile terminal 20 need not have any knowledge of the source of the received tag identification, substantially all users may collect location information for all tags that are in proximity to the tag sensors (mobile terminals 20) to support geographic location services. This collection, formatting and transmitting may be done automatically (in background) so that it should not affect the usability of the mobile terminal 20 for the user of the mobile terminal 20.

As will be further described in, this may be done anonymously to limit or prevent any integrity issues related to collecting geographic location information for tags that the user does not own (or are not owned by someone who has established the user as authorized to act for the owner). The only entity that need know the tags real identity (and owner) may be a internet cloud based server computer hosting a location service. The location service may only permit location information for the object to be communicated to the object's owner and secondary users permitted by the owner of the tag.

The "tag" can be attached to the moveable objects and may be any shape/size that can be incorporated into/on the moveable objects. The moveable objects can be wallets, keys, mobile telephones, clothing, automobiles, and may even be included in printed inks on, for example, paper. Other objects can also incorporate tags, which objects need not be movable objects. However, the geographic location features discussed above typically are only beneficial for movable objects as the geographic location of fixed objects is generally known and unchanging. The range of the short range wireless transmission protocol and supporting devices assures that any such identified objects are within a close proximity of the mobile terminal 20 at the time of receipt of the tag identification by the mobile terminal 20.

The information stored in the tag can be identification (ID) information that can uniquely identify the tag and, thus, any object associated with the tag. For example, two different moveable objects can have respective tags that each store different ID information that can be used to distinguish the two moveable objects. It will be understood that the interface circuit 265 includes an antenna (not shown) via which the short range wireless signals are received. The short range antenna can be included in the antenna system 246 or can be a separate structure (internal or external). The mobile terminal 20 can also include a tag 215 that includes ID information that uniquely identifies the mobile terminal 20 (as a moveable object according to some embodiments of the invention).

The mobile terminal 20 may include a location determination circuit 260. The location determination circuit 260 may be configured to determine the location of the mobile terminal 20 in a variety of ways, some of which will now be described. However, it will be understood that, in some embodiments, the mobile terminal 20 itself need not know or determine its own location and report the same to the location service where that information is available to the location service from another source. In addition, in embodiments not using geographic location information, the mobile terminal 20 may also not include a location determination circuit 260.

In some embodiments according to the invention, the location determination circuit 260 is a Global Positioning System (GPS) location circuit, including a GPS receiver circuit, that uses, for example, any available GPS or assisted GPS based location approach in conjunction with a GPS satellite system 274. Such approaches are commonly referred to as assisted-GPS, which is defined, for example, in specification numbers 3GPP TS 04.31, 3GPP TS 03.71 and 3GPP TS 04.35. Assisted-GPS approaches are also discussed, for example, in U.S. Pat. Nos. 4,445,118, and 5,418,538, and 5,663,734, and 5,663,735, and 6,433,735, and in published US Patent Application No. US 2003/0011511 A1, the disclosures of which are hereby incorporated herein by reference.

In some alternative embodiments according to the invention, the location determination circuit 260 is a network location circuit that uses location information provided by the network 10, such as a base station ID for the base station 30 servicing the mobile terminal 20, that has location information associated therewith. In some other embodiments according to the invention, the location determination circuit 260 is a local area network location circuit that uses location information provided via the local wireless network 270 (through a local wireless interface circuit not shown) to determine the location information for the mobile terminal. Other location determination approaches may be used. In some embodiments according to the invention, the local area network is a WLAN compliant network. In some other embodiments according to the invention, the local wireless network 270 is a Bluetooth compliant interface. In any event, the local wireless network 270 can be used to provide information to the location determination circuit 260 to determine the location information for the mobile terminal 20.

A memory 253 can store computer program instructions that, when executed by the processor circuit 251, carry out the operations described herein and shown in the figures. The memory 253 can be non-volatile memory, such as EEPROM (flash memory), that retains the stored data while power is removed from the memory 253. In some embodiments, the memory 253 can also store a location information table including location information, such as most recently known location information/time information, for objects that are owned by a user associated with the mobile terminal.

Also shown in the embodiments of FIG. 2 is a detected tag registration module 225. The detected tag registration module 225 is configured to receive, using the communication interface 242, a transmitted self identification to detect one of the anonymous tags as a detected tag when the detected tag is activated in the vicinity of the mobile terminal 20. The detected tag registration module 225 is also configured to determine that the detected tag is not yet registered with the location service and to transmit, using the communication interface 242, an identification of the tag and the owner (associated with the mobile terminal 20) to the location service to register the tag as belonging to the owner at the location service to limit registration of the tag at the location service. However, in some embodiments related to anonymous communications related to objects, the mobile terminal 20 may not include the detected tag registration module 225.

Figure 3:
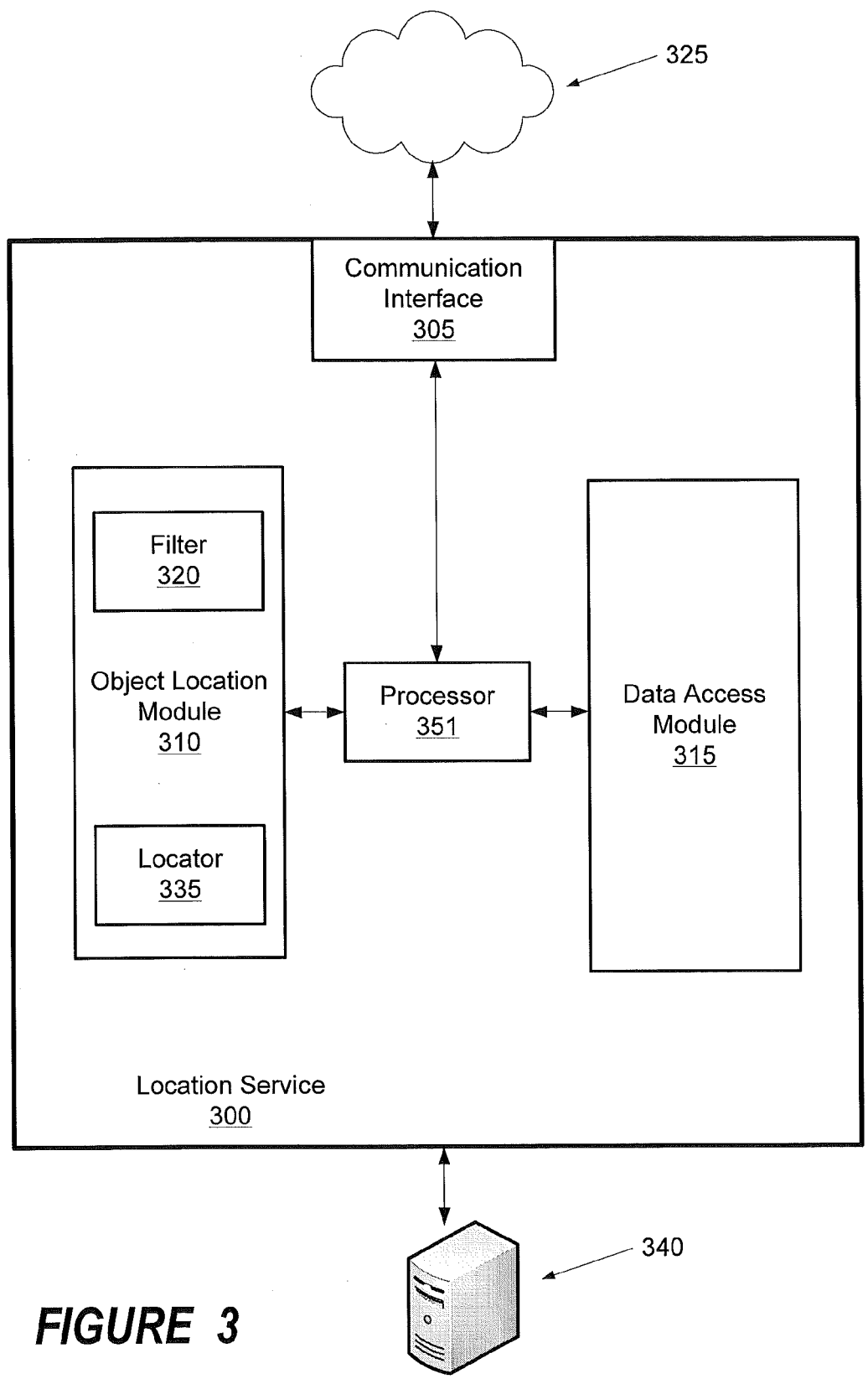
FIG. 3 is a schematic block diagram that illustrates a computer server including a location service according to some embodiments of the invention.

FIG. 3 is a block diagram that illustrates embodiments of a computer server including a location server 300 including a location service that supports geographic location information, which location service may also support registration and/or anonymous communications services according to embodiments of the invention as described herein. The location service 300 is configured to provide geographic location information associated with movable objects. As illustrated in FIG. 3, the location service 300 includes a processor 351, which, to the extent already described with reference to the processor 251 of FIG. 2 will not be further described.

The processor 351 is coupled to a memory 340 that includes, for each of the movable objects, identification information associated with the respective movable object and an owner associated with the respective movable object. As the location service 300 has access to this information, the tag sensors providing ID information reports need not to have been provided notification of the identification information associated with the respective movable objects or of the owners associated with the respective moveable objects. While the memory 340 is shown in FIG. 3 as a data base remote from and communicatively coupled to the location service 340, it will be understood that the memory may be implemented on the computer server hosting the location service 300.

Also shown in FIG. 3 is a communication interface 305 coupled to the processor 351. The communication interface 305 is configured to receive tag identification (ID) information reports from tag sensors.

An object location module 310 executing on the processor 351 is configured to update location information associated with the movable objects, that is stored in the memory 340, responsive to received ID information reports to provide updated location information for the moveable objects. The illustrated embodiments of FIG. 3 also include a data access module 315 executing on the processor 351 that is configured to allow access to the location information associated with respective ones of the movable objects only to requestors authorized by the owner associated with the respective ones of the movable objects.

Embodiments of the present invention related to tag registration will now be further described. Tag registration may be used to connect the owner of a tag to the actual physical tag. Typically, tags are not connected to any user/owner when bought from the store. In order to take ownership of the tag, the user/owner must register themselves as owner of the tag before it is used. Common solutions for this kind of secure registration are typically based on a secret password or code (for example, supplied on paper) attached with the physical tag. The password is then used as a key to allow registration of the tag product. In some embodiments as described herein, tags are registered through a tag sensor (typically a mobile terminal associated with a user (owner)) at the time when the tag is activated.

As such, registration may be done in a secure manner without the need for any secret code. This may simplify both logistics in production and improve usability for the end consumer (purchaser/owner). As used herein, anonymous tags include short range transmitters so that the tags are detectable only in close proximity of the tag itself (i.e., the transmitted identification of the tag is only received over a limited range). In addition, as described above tags may be anonymous, which means the tag's identity generally cannot be derived by scanning its code on a single occasion. As such, tags may only be used when close to the tag and it can be established in a method that would not allow a previously scanned tag to be used for registration at a later stage. As such, secure registration may be provided without using a secret code associated with the tag.

The short range transmitters of the tag may be, for example, a low power Bluetooth protocol transmitter or an ANT protocol transmitter. The ANT protocol is designed and marketed by Dynastream Innovations Inc., a Cochrane, Canada based company. The ANT protocol does not use a Media Access Control (MAC) address. As such, anonymity will not be lost by inclusion of a static identifier.

In some embodiments, while tags are still on the shop/store, they are not powered, which effectively makes unlawful registration while in the shop impossible. Registration of a newly purchased tag using a mobile terminal as a tag sensor may include in some embodiments:

1) Unpacking the tag from its packaging.
2) Activation by the user of a registered new tag application in the user's mobile terminal.
3) Authentication of the user towards a location service using, for example, OpenID or similar authentication protocol for a mobile terminal.
4) The mobile terminal/tag scanner then scans for new unregistered tags in its proximity. The mobile terminal may be configured to only present unregistered tags and may be furthered configured to present the closest tag first.
5) The tag is powered by pushing a one-way button (or removing a slip from its case), for example. Such an approach may enable the tag to start beacon transmission of its self-identity. The one-way operation of the activation should maintain transmission of the tag with its self-identity beacon until its internal battery is exhausted as a user may not turn the power off using the one-way button.

6) The tag is then sensed by the mobile terminal and may be presented to the user, for example, on a display of the mobile terminal.

7) The user may select the new tag as the target for registration and, by this action, accept him or herself as the owner for the new tag. The ownership is then stored at the location service. In some embodiments, tag registration for this specific tag is only allowed once.

Embodiments utilizing such a registration approach may provide for a simple but also very secure registration process. In some embodiments, if the tag registration has failed and an unlawful user has taken ownership of the tag, it is still possible to use a secret code that allows the tag to be unregistered by the valid owner (for example, by over-riding the initial registration). This may enable the tag to be registered again following the scenario described of failed registration. In such embodiments, the tag may be powered during re-registration but registration will not be allowed until it has been unregistered (deregistered).

Unregistration/deregistration may also be performed without the use of any code by the lawful/valid owner of the tag. Because an owner is authenticated towards the location service, they may be allowed to unregister any of the tags that they have previously registered. Such an approach may be used to, for example, transfer tags to a new owner after purchase by the original owner.

The owner of a tag may be permitted to relay any kind of permission to other users once registered. For instance, it may be useful to enable tags to be shared between family members. Permission transfer may be enabled by generating a secret key, specific for the tag, which is then transmitted. The transmission may be over any suitable communication channel, such as short message service (SMS) or email. Other ways of transmitting permissions are also possible. In some embodiments, permissions are transferred by transmitting a secret key known only to owner, location service and, after transmission, the other selected user. The secret key in some embodiments is temporary and only valid for a limited number of other users.

In further embodiments, it is possible to support a public registration identity of the tag that is only used during registration. The public registration identity/code may be a single or few letters or digits and is not the tag's transmitted self-identity (which is typically 64 bits). The registration code may, for example, be printed on the tag itself or on a label attached to the tag. During registration, the public code may be retrieved from the location service to differentiate between different tags that are all unregistered and powered. This may be useful, for example, in a corporate environment where many tags are registered at once in a single local vicinity.

Figure 4:
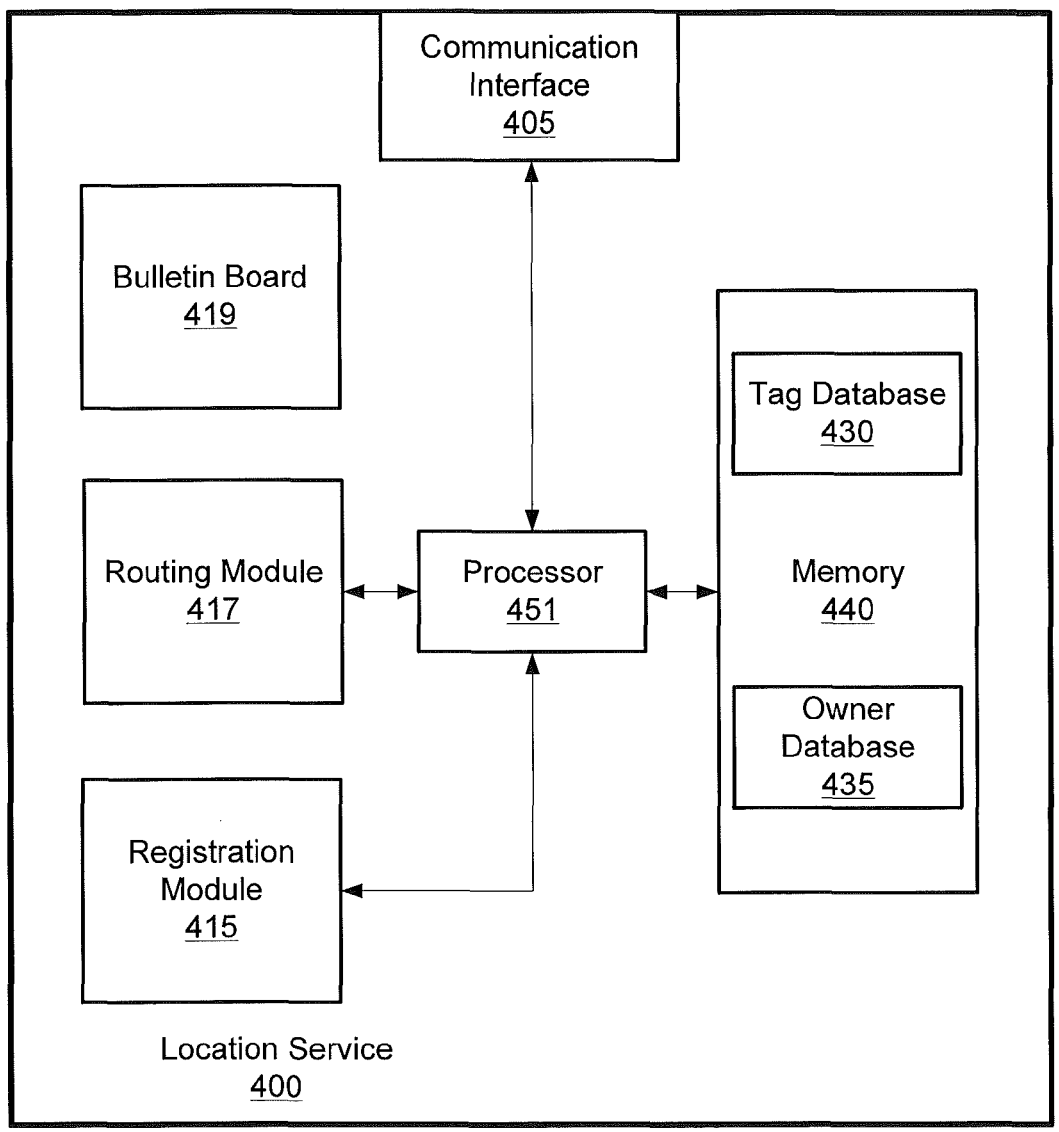
FIG. 4 is a schematic block diagram that illustrates a computer server including a location service according to other embodiments of the invention.

FIG. 4 is a block diagram that illustrates embodiments of a computer server including a location server 400 including a location service that supports tag registration, which location service 400 may also support geographic location as described previously and/or anonymous communications services as described later herein. The location service 400 is configured to provide information associated with anonymous tags that are registered with the location service 400. As illustrated in FIG. 3, the location service 400 includes a processor 451, which, to the extent already described with reference to the processors 251, 351 will not be further described.

The processor 451 is coupled to a memory 440 that includes, for each of the movable objects, a registered tag database 430 and an owner database 435. As the location service 400 has access to this information, the tag sensors communicating therewith need not to have been provided notification of the identification information associated with the respective tags or of the owners associated with the respective tags. While the memory 440 is shown in FIG. 4 as an internal memory to the computer server hosting the location service 400, as described with reference to FIG. 3, the data base may be remote from and communicatively coupled to the location service 400.

The registered tag database 430 includes, for each of a plurality of registered ones of the anonymous tags, a self identification and an owner associated with each of the registered ones of the anonymous tags. The database 430 may also include information related to other users who have been authorized by the owner to have at least some access to information related to the tag. The owner database 435 includes, for each of a plurality of registered owners, at least one tag sensor and/or other communication device associated with each of the registered owners.

Also shown in FIG. 4 is a communication interface 405 coupled to the processor 451. The communication interface 405 is configured to receive a registration request, that includes identification of one of the anonymous tags, from one of the tag sensors of one of the registered owners.

The location service 400 may include a registration module 415 executing on the processor 451 is configured to determine if the one of the anonymous tags identified in a received registration request is already registered using the registered tag database 430. The registration module 415 is also configured to update the registered tag database 430 to include an entry for the one of the anonymous tags identified in the received registration request to register the tag identified in the received registration request. Based on the information in the owner database 435, the tag is registered as associated with the owner identified as associated the with tag sensor (e.g., mobile terminal), by login of the owner at some earlier time or otherwise as discussed above, from which the request was received. In other words, by associating the request with the owner, the communication from the tag sensor is considered to be valid (ie, is secured), thereby authenticating the originating tag sensor. In some embodiments, the owner database 435 may be used by the location service 400 to identify the owner based on the identity of the mobile terminal sending the registration request.

The location service 400 may include a routing module 417 that supports communications related to detection of an anonymous tags. The routing module 417 is configured to identifying an object associated with an ID information report that includes a tag self identification received from the mobile terminal 20 and to determine an owner associated with the identified object using the registered tag database 430. The routing module 417 is also configured to route a communication, using the communication interface 405, between a user associated with a tag sensor that detects the tag, such as a first mobile terminal and a second mobile terminal (or other communication device communicatively coupled to the service) associated with the owner of the tag (as identified in the owner database 435) responsive to the received tag identification. The identified device in the owner database 435 may stay associated with the owner until removed or may only remain associated with the owner for a particular interval, such as while the owner is logged into the service using the device. This routing is provided without identifying the user of the first mobile terminal to the owner or the owner to the user of the first mobile terminal. Also shown in FIG. 4, is a bulletin board 419, supported by the location service 400. Communications routed by the routing module 415 may be routed to the bulletin board 419, which may be accessible for reading and/or writing communications by all of the users of the location service 400.

It is to be understood that the present invention is not limited to the particular configuration shown in FIGS. 1 through 4, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 4 may be implemented as a single processor system or a multi-processor system in accordance with various embodiments of the present invention.

Figure 5:
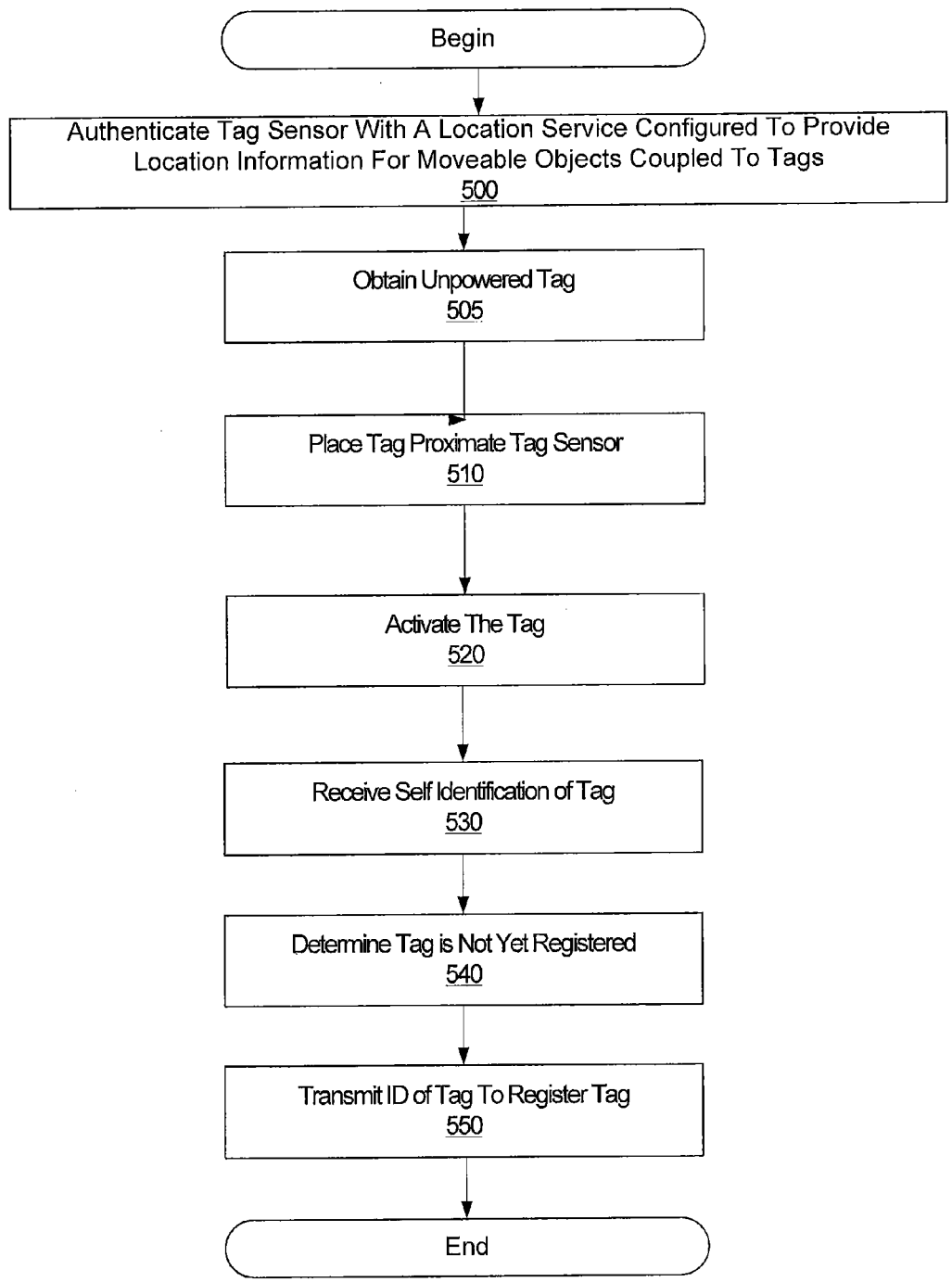
FIG. 5 is a flowchart that illustrates operations of methods, computer program products, and anonymous tag registration services according to some embodiments of the invention.

FIG. 5 is a flowchart that illustrates operations of methods, computer program products, and systems for registration of an anonymous tag having an owner with a location service. Operations for the illustrated embodiments include authenticating a tag sensor associated with the owner of the tag with the location service (Block 500). It will be understood that authenticating the tag sensor may be accomplished in a variety of ways to assure a proper/authorized owner is able to register a tag. For example, in some embodiments, an owner will log into a location service before the tags are registered in a manner that allows the service to associate reports received from the tag sensor for registration. For example, the owner could log in using the tag sensor to initiate an IP formatted communication associating the owner with the IP address of the device transmitting the identification of the tag to the service for registration. However, other methods of so authenticating the tag sensor, either from the tag sensor or from another device in communication with the service that can provide the association fall within the scope of the present invention. In other embodiments, for example, the tag sensor may be a mobile terminal having an identification that is known to the location service and associated with the owner and operations at Block 500 may include transmitting the identification of the mobile terminal to the location service from the tag sensor A tag is obtained in some embodiments that has not been registered with the location service for use as the tag (Block 505). The power to the tag is off when the tag is obtained. The tag is placed within a defined distance, corresponding to the range of the tag's transmitter, from a tag sensor associated with the owner of the tag (Block 510). The tag is activated while it is within the defined distance from the tag sensor to initiate transmission of the self identification (Block 520).

In some embodiments, operations at Block 520 include turning on the power to the tag, which was obtained with the power off, within the defined distance from the tag sensor. Turning on the power to the tag may include turning on the power to the tag using an actuator that cannot be reset to turn the power to the tag off. As such, the tag will continue transmission of the self identification until a battery included in the tag is discharged. This may increase the security of the tag registration. The one-way (on only) activation may provide assurance to the owner that the tag has not been registered before and that it cannot be shut-off unlawfully. The initially un-powered tag embodiments may also increase tag battery lifetime.

The transmitted self identification from the activated tag is received at the tag sensor to detect the tag (Block 530). Operations at Block 530 may include receiving additional self identifications from multiple transmitting tags in the vicinity of the tag sensor. It is determined that the detected tag (or tags) is not yet registered with the location service (Block 540). An identification of the tag and the owner is transmitted to the location service from the tag sensor to register the tag as belonging to the owner at the location service and to limit registration of the tag at the location service (i.e., so that others may not claim ownership of the tag) (Block 550). Detected tags that are already registered with the location service are not registered as belonging to the owner at the location service.

Further embodiments that illustrate operations of methods, computer program products, and systems for registration of an anonymous tag having an owner with a location service will now be described with reference to the flowchart illustrations of FIGS. 6 and 7. Note that the flowchart of FIG. 6 includes many separate operations associated with various embodiments that may be used separately or in combination, either in the order shown in FIG. 6 or in other orders. For the illustrated embodiments of FIG. 6, transmitted self identifications are received from more than one tag (Block 600). The signal strength of the received transmitted self identifications of the tags are compared to select a self identification to register first (Block 605). While operations for selection are described with reference to a single selection based on strongest signal, it will be understood that, in some embodiments, different criteria for ordering tags may be used and more than one of the ordered tags may be selected. For example, a list of all detected tags could be presented to a user for selection of the tag or tags to register. In some embodiments, to facilitate multiple selections, each of a plurality of tags may include a visible public code associated therewith as well as having their own self identifications for use in differentiation between the plurality of tags.

If the selected tag is not yet registered (Block 610), the identification of the selected tag is presented to a user on a display of the mobile terminal (Block 615). Responsive to receiving a selection of the displayed identification as belonging to the owner from the user, the identification is transmitted to the location service for registration (Block 620). If the selection is not received, the identification may not be transmitted.

In some embodiments, operations at Block 610 include receiving a message at the tag sensor from the location service indicating that the tag is already registered to another owner. When the tag is already registered at Block 610, a confidential ownership code for the tag may be determined that is only provided to a lawful owner of the tag (Block 625). The ownership code is transmitted to the location service to un-register the tag so that the tag is not associated with the another owner at the location service (Block 630). After the tag is unregistered, the received self identification of the selected tag may be transmitted to the location service to register the tag to the owner (Block 635).

Tags can also be un-registered in other manners in some embodiments. For example, a registered owner for a tag may transmit a request to un-register the tag to the location service from the tag sensor associated with the owner to allow the tag to be registered as belonging to another owner. In addition, the owner may transmit a permission from the tag sensor of the owner to another tag sensor that authorizes another owner associated with the another tag sensor to obtain information related to the tag from the location service.

The multiple tag self identifications received at Block 600 may all be available for registration to an owner, such as a corporation. In some embodiments, to facilitate such group registrations, each of a plurality of tags may include a visible public code associated therewith as well as having their own self identifications. Transmitting the identification at Block 620 may be followed by retrieving the visible public code for each tag from the location service for use in differentiation visually between the plurality of tags.

Referring now to the embodiments of FIG. 7, computer-implemented methods of registration of an anonymous tag at a location service according to further embodiments will now be described as carried out by the location service. A tag sensor associated with an owner is registered with the location service (Block 710). A request is received to register the tag from the tag sensor at the location service (Block 720). The request to register includes the self identification of the tag and an identification of the tag sensor. It is determined, based on the self identification of the tag, if the tag is already registered (Block 730). A notification is transmitted to the tag sensor that the tag is already registered when it is determined that the tag is already registered at Block 730 (Block 740). When it is determined that the tag is not yet registered at Block 730, the owner of the tag is determined based on the received identification of the tag sensor and the tag is registered as belonging to the owner at the location service (Block 750). The self identification of the tag received at Block 710 and the identification of the tag sensor at Block 710 may be received from two different transmissions.

Figure 6:
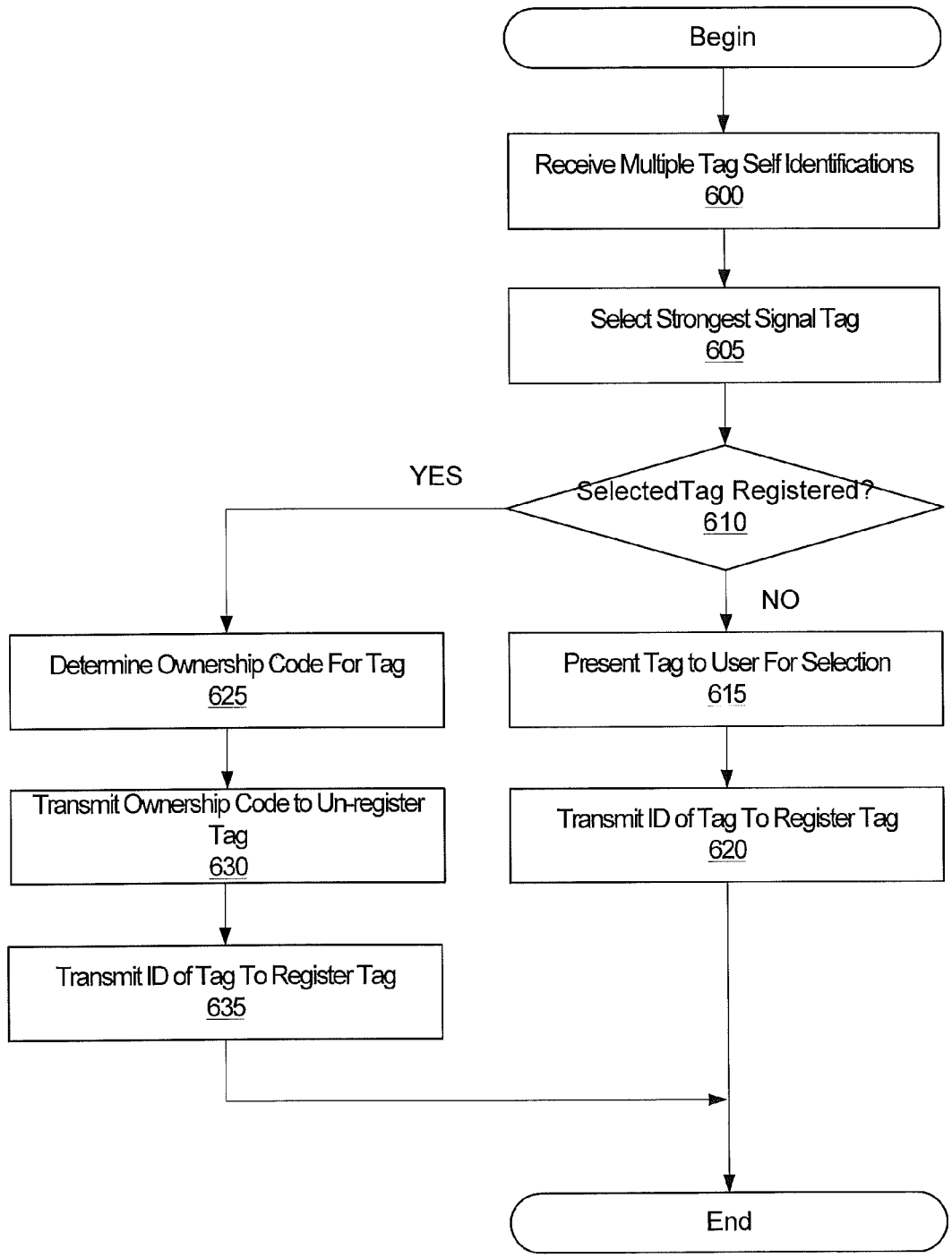
FIG. 6 is a flowchart that illustrates operations of methods, computer program products, and anonymous tag registration services according to some embodiments of the invention.
Figure 7:
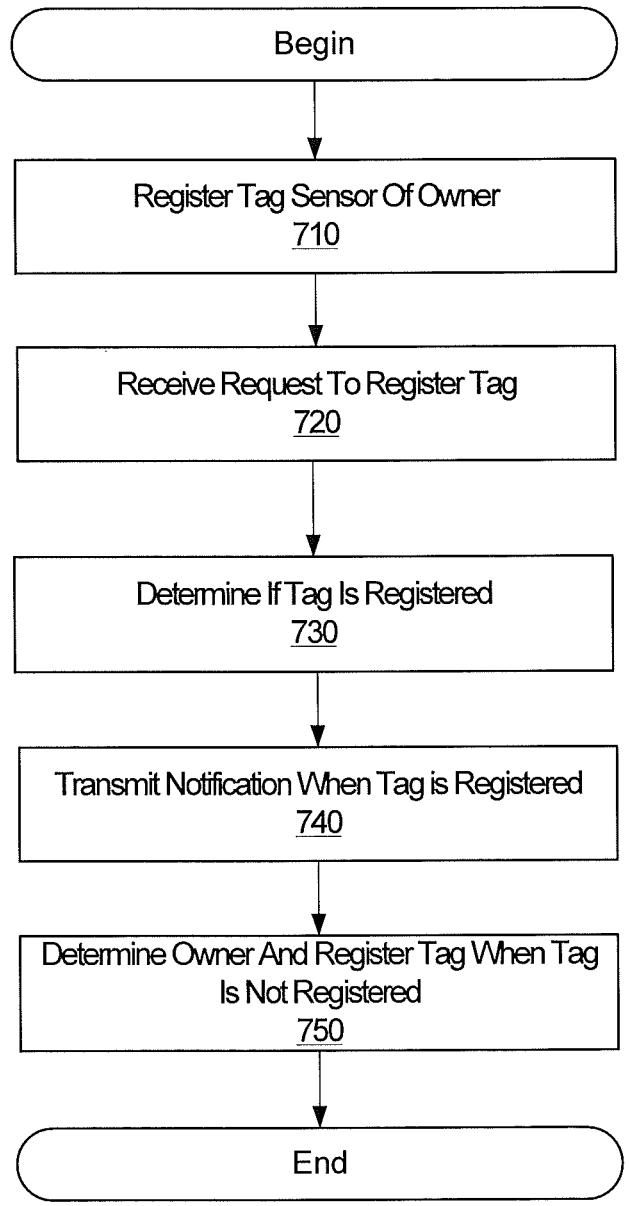
FIG. 7 is a flowchart that illustrates operations of methods, computer program products, and anonymous tag registration services according to some embodiments of the invention.

It will be understood that the blocks illustrated in FIGS. 5 to 7 may represent operations carried out for each of a plurality of tags to be registered. In addition, a given tag sensor may provide information related to multiple tags in its vicinity.

In other embodiments of the present invention, methods, computer program products and systems for providing communications related to detected anonymous tags are provided as will be described with reference to FIGS. 8 to 10. For example, when an individual detects a (lost) object (i.e., a tag attached to an object), it may be desirable to send a message to the finder. This message could be, for example a pre-written (asynchronous) message and/or a synchronous/live message. The privacy of the parties in some embodiments may be assured as long as both parties want privacy to be maintained.

When someone (not the owner) is in range of a tagged object the owner may wish to initiate a message to the detecting tag sensor as described above. However, the initiation could also be in the other direction. In other words, the finder may send messages to the owner. It is then up to the parties to choose to initiate a conversation, to disclose their phone numbers, email addresses and the like. In some embodiments, the privacy of each party is protected via the cloud service (as implemented at the location service) and the connection is initiated by the tagged object association/detection.

In some embodiments, for example, an owner initiated communication may occur when Owner A, having lost a dog, uploads a message to send to a potential finder. Someone else, finder B, locates the dog and sends the position of the dog to the location service over the cloud. Finder B then receives the message that had been previously uploaded by Owner A. Owner A is now notified about the recently detected position of the dog and that Owner A's message has been sent. Both parties can then continue to send anonymous messages to each other through the location service.

In a further approach, a finder initiated communication may be used. For example, when Finder B finds Owner A's dog, Finder B sends a message to its owner, without knowing who the owner is but instead relying on the location service for the routing of the message. Both parties can now continue to send anonymous messages to each other as desired.

The messages could be sent either openly or anonymously. The receiver then can then decide to allow reception of the message based on this information. As an example, SPAM or other unwanted communications could be avoided by screening anonymous messages.

Other example embodiments include implementation as an electronic bulletin-board where all can read and leave messages from/to each other anonymously through the location service. In other embodiments, tags could be silent in a normal state and be activated by pushing a button. For example, an advertisement board. When the button is pushed the activator of the button may use the action to get in contact with the advertiser associated with the advertisement board. Both parties may remain anonymous and leave messages for each other through the location service as described above. In other words, the tag sensor may be an actuator coupled to a physical display like an advertisement board that is configured to transmit the ID information report responsive to activation of the actuator by a user and the identified object may be the physical display.

Figure 8:
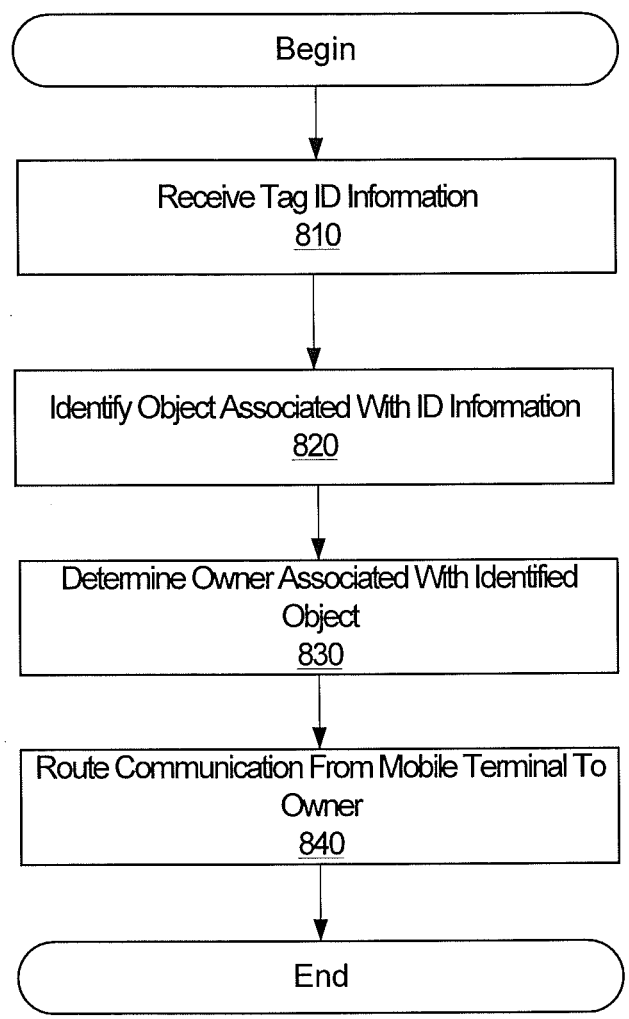
FIG. 8 is a flowchart that illustrates operations of methods, computer program products, and anonymous tag communication services according to some embodiments of the invention.

Referring now to the figures, operations for the embodiments of FIG. 8 begin at Block 810 by receiving a tag identification (ID) information report from a mobile terminal (Block 810). The ID information report may, in some embodiments, include a location of the mobile terminal providing the ID information report. An object associated with the ID information report received from the mobile terminal is identified (Block 820). An owner associated with the identified object is determined (Block 830). A communication is routed between the mobile terminal and the owner responsive to the received tag identification (Block 840). The communication at Block 840 is routed without identifying the mobile terminal to the owner or the owner to the mobile terminal.

Figure 9:
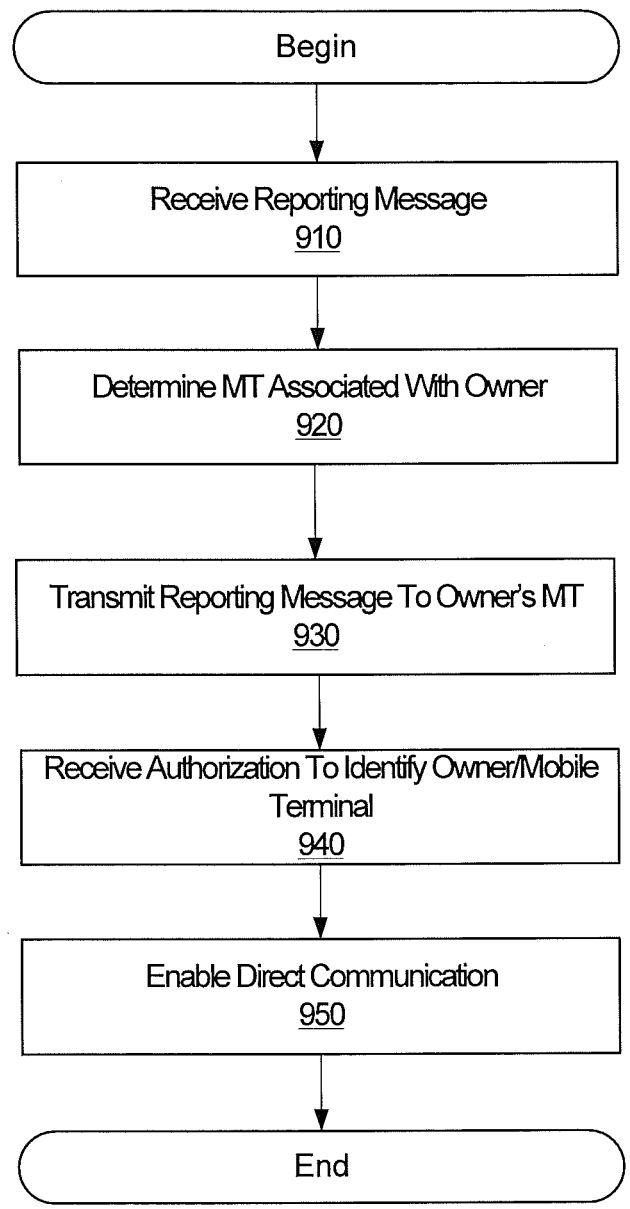
FIG. 9 is a flowchart that illustrates operations of methods, computer program products, and anonymous tag communication services according to some embodiments of the invention.

Referring now to the embodiments illustrated in the flowchart of FIG. 9, routing a communication includes receiving a reporting message associated with the ID information report from the first (i.e., reporting) mobile terminal (Block 910). The reporting message is provided for transmission to the owner. A mobile terminal associated with the owner is determined (Block 920). The received reporting message is transmitted to the mobile terminal associated with the owner (Block 930). Operations at Block 930 may include transmitting an identification of a source of the reporting message. The reporting message may only be transmitted responsive to a received acceptance from the mobile terminal associated with the owner.

An authorization may be received from the owner to identify the owner to the first mobile terminal or from the first mobile terminal to identify the first mobile terminal to the owner (Block 940). Direct communications are then enabled (Block 950). Where the authorization is received from the owner at Block 940, operations at Block 950 may include identifying the mobile terminal associated with the owner to the first mobile terminal to enable direct communications between the mobile terminal associated with the owner and the first mobile terminal. Where the authorization is received from the first mobile terminal at Block 940, operations at Block 950 may include identifying the first mobile terminal to the mobile terminal associated with the owner to enable direct communications between the mobile terminal associated with the owner and the first mobile terminal.

Figure 10:
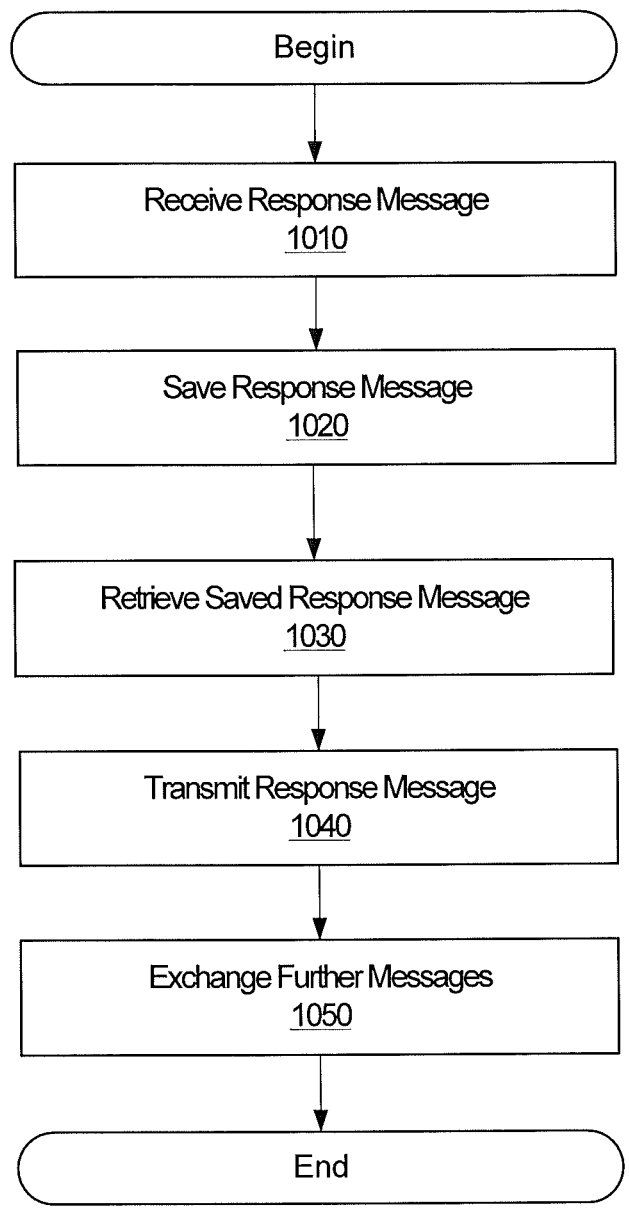
FIG. 10 is a flowchart that illustrates operations of methods, computer program products, and anonymous tag communication services according to some embodiments of the invention.

Referring now to the embodiments illustrated in the flowchart of FIG. 10, a response message associated with an identified movable object is received from the owner of the object (Block 1010). The received response message and a relationship of the message to the identified object is saved (Block 1020). The saved response message associated with the identified object is retrieved when needed responsive to a received tag ID information report for the identified object (Block 1030). The response message is transmitted to the first (reporting) mobile terminal without identifying the owner (Block 1040). A notification of transmission of the response message may also be transmitted to the owner at Block 1040 without identifying the first mobile terminal. Further messages may be exchanged between the owner and the mobile terminal without identifying the owner to the mobile terminal or the mobile terminal to the owner (Block 1050).

As discussed previously, the object may be a movable object and the received ID information may include a location of the first (reporting) mobile terminal. The notification of the transmission at Block 1040 may include the location of the first mobile terminal to provide the owner updated location information for the movable object.

In other words, when the received ID information includes a location of the mobile terminal, routing the communication may include transmitting a notification of location information for the movable object to the owner that includes the location of the mobile terminal to provide the owner updated location information for the movable object, responsive to receiving the ID information report, without identifying the mobile terminal to the owner. A response message may be received from the owner responsive to the transmitted notification of location information. The received response message may be transmitted to the mobile terminal without identifying the owner to the mobile terminal.

Although various embodiments of the present invention are described in the context of wireless communication terminals for purposes of illustration and explanation only, the present invention is not limited thereto. It is to be understood that the present invention can be more broadly used in any sort of electronic device configured to serve as a tag sensor. In addition, anonymous tags as described herein may be used in applications other than location services. By using constantly changing pseudo-random tag identifications, it may be possible to protect the privacy/integrity of the tag owners and, hence, limit or even prevent other unauthorized users from tracking the tags. In addition to protecting owner privacy, the anonymous tags could also protect the location service gathering the data by increasing the difficulty of offering a competing location service using the tags attached to the movable objects.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of registration of an anonymous tag having an owner with a server comprising a location service that is configured to provide location information for moveable objects coupled to tags, wherein the tag is configured to transmit a self identification over a defined distance using a short range wireless protocol, wherein a tag sensor associated with the owner of the tag is configured to receive the self identification using the short range wireless protocol and configured to communicate with the server comprising the location service, the method comprising:

authenticating the tag sensor associated with the owner of the tag with the server comprising the location service, the location service being configured to provide the location information for the moveable objects coupled to the tags by transmitting, to the owner of the tag, a notification comprising a geographical location of a first mobile terminal that is not associated with the owner of the tag without identifying the first mobile terminal, the first mobile terminal being configured to receive the self identification from the tag and to provide the geographical location to the server;

placing the tag within the defined distance from the tag sensor associated with the owner;

activating the tag while it is within the defined distance from the tag sensor to initiate transmission of the self identification;

receiving the self identification of the tag at the tag sensor to detect the tag and receiving an additional self identification of another tag;

comparing a signal strength of the self identification of the tag with a signal strength of the additional self identification of the another tag;

determining based on the comparison that the signal strength of the self identification of the tag is greater than the signal strength of the additional self identification of the another tag;

determining that the detected tag is not already registered with the location service; and transmitting an identification of the tag and the owner to the location service from the tag sensor to register the tag as belonging to the owner at the location service to limit registration of the tag at the location service based on the determination that the signal strength of the self identification of the tag is greater than the signal strength of the additional self identification of the another tag and based on the determination that the detected tag is not already registered with the location service, wherein the registration of the tag is allowed only when the tag is unregistered, wherein activating the tag comprises turning on power to the tag within the defined distance from the tag sensor, before the tag sensor detects the tag, and wherein turning on the power to the tag comprises turning on the power to the tag using an actuator that cannot be reset to turn the power to the tag off so that the tag will continue transmission of the self identification until a battery included in the tag is discharged.

2. The method of claim 1, wherein the tag sensor comprises a second mobile terminal.

3. The method of claim 2, wherein the method further comprises determining that the another tag is already registered with the location service and not registering the another tag as belonging to the owner at the location service based on the determination that the another tag is already registered with the location service.

4. The method of claim 2, wherein transmitting the identification is preceded by:

presenting the identification of the tag on a display of the second mobile terminal; and
receiving a selection of the displayed identification as belonging to the owner, wherein transmitting the identification is only carried out responsive to receiving the selection of the displayed identification.

5. The method of claim 2, wherein determining whether the tag is registered includes:
receiving a message at the tag sensor from the location service indicating that the tag is already registered to another owner; and then
determining a confidential ownership code for the tag that is only provided to a lawful owner of the tag; and
transmitting the ownership code to the location service to un-register the tag so that the tag is not associated with the another owner at the location service.

6. The method of claim 2, wherein transmitting the identification of the tag to the location service from the tag sensor is followed by transmitting a request to un-register the tag to the location service from the tag sensor to allow the tag to be registered as belonging to another owner.

7. The method of claim 2, wherein transmitting the identification of the tag to the location service from the tag sensor is followed by transmitting a permission from the tag sensor to another tag sensor that authorizes another owner associated with the another tag sensor to obtain information related to the tag from the location service.

8. The method of claim 2,
wherein the tags each include a visible public code associated therewith and each have a self identification, and
wherein transmitting the identification of the tag to the location service from the tag sensor is followed by retrieving the visible public code for each of the tags from the location service for use in differentiation visually between the tags.

9. The method of claim 1, wherein authenticating the tag sensor comprises initiating an IP-formatted communication between the tag sensor and the location service, before the tag is registered with the location service as belonging to the owner and before turning on power to the tag.

10. The method of claim 1, further comprising presenting the tag on a display of the tag sensor only when the tag is unregistered.

11. A first mobile terminal that is associated with an owner of a tag comprising:
a processor; and
a communication interface coupled to the processor and configured to:
communicate over a wide area network with a server comprising a location service that is configured to provide location information for moveable objects coupled to respective tags by transmitting, to the owner of the tag, a notification comprising a geographical location of a second mobile terminal that is not associated with the owner of the tag without identifying the second mobile terminal, the second mobile terminal being configured to receive a transmitted self identification from the tag and to provide the geographical location to the server; and
receive transmissions from the tag in the vicinity of the first mobile terminal and additional transmissions from another tag in the vicinity of the first mobile terminal using a short range wireless protocol,
wherein the processor is configured to receive, using the communication interface, the transmitted self identification to detect one of the tags as a detected tag when the detected tag is activated in the vicinity of the first mobile terminal, to receive an additional transmitted self identification of the another tag, to compare a signal strength of the self identification of the detected tag with a signal strength of the additional transmitted self identification of the another tag, to determine based on the comparison that the signal strength of the self identification of the detected tag is greater than the signal strength of the additional transmitted self identification of the another tag, to determine that the detected tag is not yet registered with the location service, and to transmit, using the communication interface, an identification of the tag and the owner of the tag to the location service to register the tag as belonging to the owner at the location service to limit registration of the tag at the location service based on the determination that the signal strength of the self identification of the detected tag is greater than the signal strength of the additional transmitted self identification of the another tag and based on the determination that the detected tag is not yet registered with the location service,
wherein the registration of the tag is allowed only when the tag is unregistered,
wherein activating the tag in the vicinity of the first mobile terminal comprises turning on power to the tag within the vicinity of the first mobile terminal, before the first mobile terminal detects the tag, and
wherein turning on the power to the tag comprises turning on the power to the tag using an actuator that cannot be reset to turn the power to the tag off so that the tag will continue transmission of the self identification until a battery included in the tag is discharged.

12. A location server comprising a location service that is configured to provide location information associated with anonymous tags coupled to respective moveable objects, the location server comprising:
a processor;
a memory coupled to the processor that includes:
a registered tag database that includes, for each of a plurality of registered ones of the anonymous tags, a self identification and an owner associated with each of the registered ones of the anonymous tags; and
an owner database that includes, for each of a plurality of registered owners, a tag sensor associated with each of the plurality of registered owners; and
a communication interface coupled to the processor that is configured to receive, from one of the tag sensors of one of the registered owners, a registration request that includes identification of one of the anonymous tags, wherein the one of the tag sensors of one of the registered owners is configured to receive a self identification from the one of the anonymous tags using a short range wireless protocol and configured to communicate with the location server, and wherein the communication interface is further configured to communicate, for the location service, the location information for the respective moveable objects coupled to the tags,
wherein the processor is configured to:
determine if the one of the anonymous tags identified in the registration request is already registered using the registered tag database and to update the registered tag database to include an entry for the one of the anonymous tags identified in the received registration request to register the one of the anonymous tags identified in the received registration request as associated with the registered owner associated with the one of the tag sensors that the request was received from using the owner database, and wherein registration of the one of the anonymous tags is allowed only when the one of the anonymous tags is unregistered;

receive, from a first mobile terminal that is not associated with the registered owner of the one of the anonymous tags, an ID information report comprising the identification of the one of the anonymous tags and a geographical location of the first mobile terminal, the first mobile terminal being configured to receive the self identification from the one of the anonymous tags and to provide the geographical location to the server; and transmit, to the registered owner of the one of the anonymous tags, a notification comprising the geographical location of the first mobile terminal without identifying the first mobile terminal, and wherein the one of the tag sensors of one of the registered owners is configured to send the registration request based on a determination that a signal strength of the self identification of the one of the anonymous tags is greater than a signal strength of an additional self identification of another tag and based on a determination that the one of the anonymous tags is not already registered with the location service.

13. The location server of claim 12, wherein the processor is configured to identify an object, among the moveable objects coupled to the tags, associated with the ID information report received from the first mobile terminal, to determine the registered owner that is associated with the identified object using the registered tag database and to route a communication, using the communication interface, between the first mobile terminal and a second mobile terminal associated with the owner associated with the identified object using the owner database responsive to the received tag identification without identifying the first mobile terminal to the owner associated with the identified object or the owner associated with the identified object to the first mobile terminal.

14. The location server of claim 13, wherein the processor is configured to route the communication using a posting on an electronic bulletin board.

15. The location server of claim 13,
wherein the object comprises a moveable object,
wherein the ID information report includes the location of the first mobile terminal from which the ID information report is received,
wherein the location service comprises a location-updating service, and
wherein the processor is further configured to transmit, from the location server for the location-updating service, the notification of location information for the moveable object to the owner that includes the location of the first mobile terminal reporting the moveable object to the location server to provide the owner updated location information for the moveable object, responsive to receiving the ID information report, without identifying the first mobile terminal to the owner.

* * * * *